United States Patent
Tsai et al.

(10) Patent No.: US 7,957,343 B2
(45) Date of Patent: Jun. 7, 2011

(54) MOTION-AWARE MOBILE TIME AND FREQUENCY TRACKING

(75) Inventors: Ming-Chang Tsai, San Diego, CA (US); Jigneshkumar Shah, San Diego, CA (US); Kanu Chadha, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 12/261,648

(22) Filed: Oct. 30, 2008

(65) Prior Publication Data

US 2009/0225662 A1    Sep. 10, 2009

Related U.S. Application Data

(60) Provisional application No. 61/034,347, filed on Mar. 6, 2008.

(51) Int. Cl.
*H04W 56/00* (2009.01)
*H04L 7/00* (2006.01)
*H04J 11/00* (2006.01)

(52) U.S. Cl. .................. 370/328; 370/516; 375/371

(58) Field of Classification Search .................. None
See application file for complete search history.

(56) References Cited

U.S. PATENT DOCUMENTS

| | | | |
|---|---|---|---|
| 6,498,789 B1 * | 12/2002 | Honda | 370/342 |
| 7,020,116 B1 * | 3/2006 | Nakada | 370/338 |
| 7,583,705 B2 * | 9/2009 | Sinha et al. | 370/503 |
| 7,668,243 B2 * | 2/2010 | Ho et al. | 375/240.28 |
| 2002/0089956 A1 * | 7/2002 | Haugli et al. | 370/335 |
| 2003/0043766 A1 * | 3/2003 | McDonough et al. | 370/335 |
| 2004/0116121 A1 * | 6/2004 | Sendonaris | 455/441 |
| 2006/0234737 A1 * | 10/2006 | Neumann et al. | 455/502 |
| 2007/0025265 A1 * | 2/2007 | Porras et al. | 370/252 |
| 2009/0029657 A1 * | 1/2009 | Sakaishi et al. | 455/113 |
| 2009/0279476 A1 * | 11/2009 | Li et al. | 370/328 |

FOREIGN PATENT DOCUMENTS

| | | |
|---|---|---|
| EP | 1912350 A1 | 4/2008 |
| WO | WO2004023679 | 3/2004 |
| WO | WO2005004329 | 1/2005 |
| WO | WO2007015394 | 2/2007 |

OTHER PUBLICATIONS

International Search Report & Written Opinion—PCT/US2009/034925, International Search Authority—European Patent Office—Jul. 8, 2009.

* cited by examiner

*Primary Examiner* — Chi H Pham
*Assistant Examiner* — Soon-Dong D Hyun
(74) *Attorney, Agent, or Firm* — Peng Zhu; Jeffrey D. Jacobs; Donald C. Kordich

(57) ABSTRACT

A method is provided for compensating for clock drift error and movement error of an access terminal. A forward link error is obtained that is attributable to at least a first error (e.g., clock drift error) component and a second error (e.g., movement error) component. The first error component and the second error component are estimated based on the obtained forward link error. A receive clock of the access terminal is compensated based on a combination of the first error component and the second error component. A transmit clock of the access terminal is compensated based on a difference between the first error component and the second error component. The forward link error may include a timing synchronization error between the access terminal and an access point as well as a frequency synchronization error between a forward link frequency and a baseband reference frequency.

42 Claims, 12 Drawing Sheets

WIRELESS NETWORK

WIRELESS NETWORK

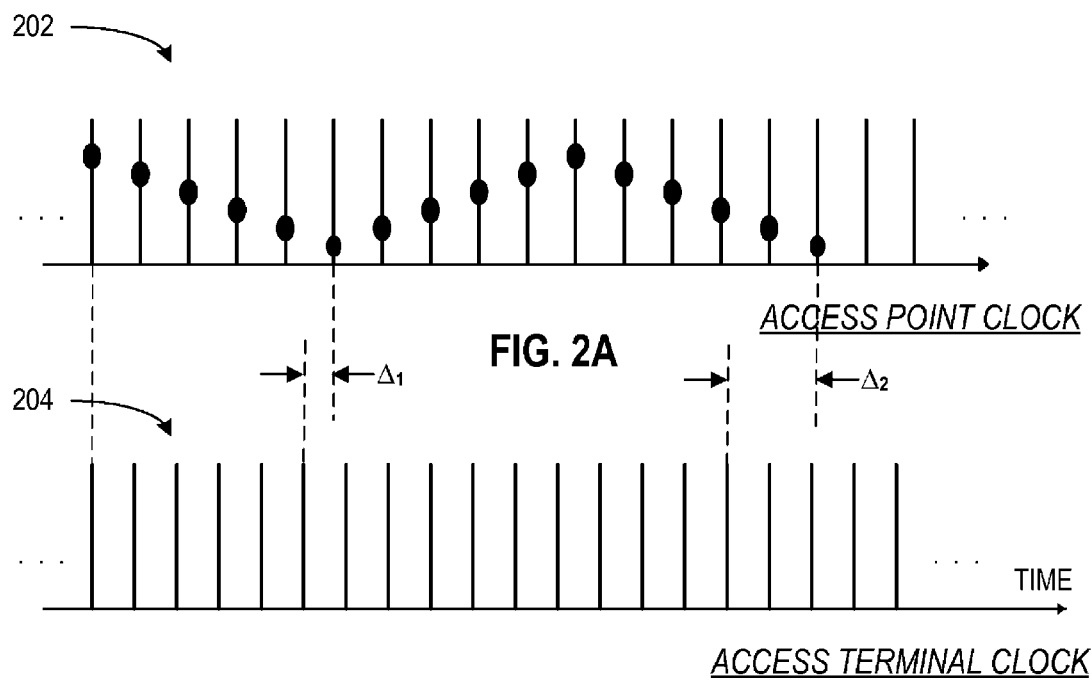
FIG. 2A
FIG. 2B
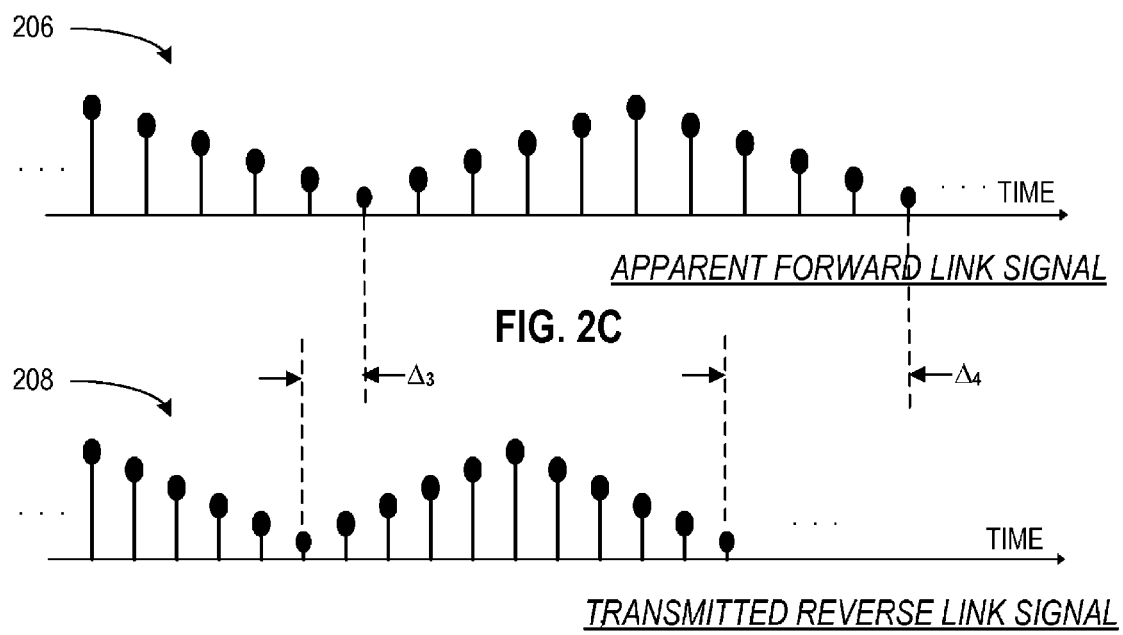
FIG. 2C
FIG. 2D

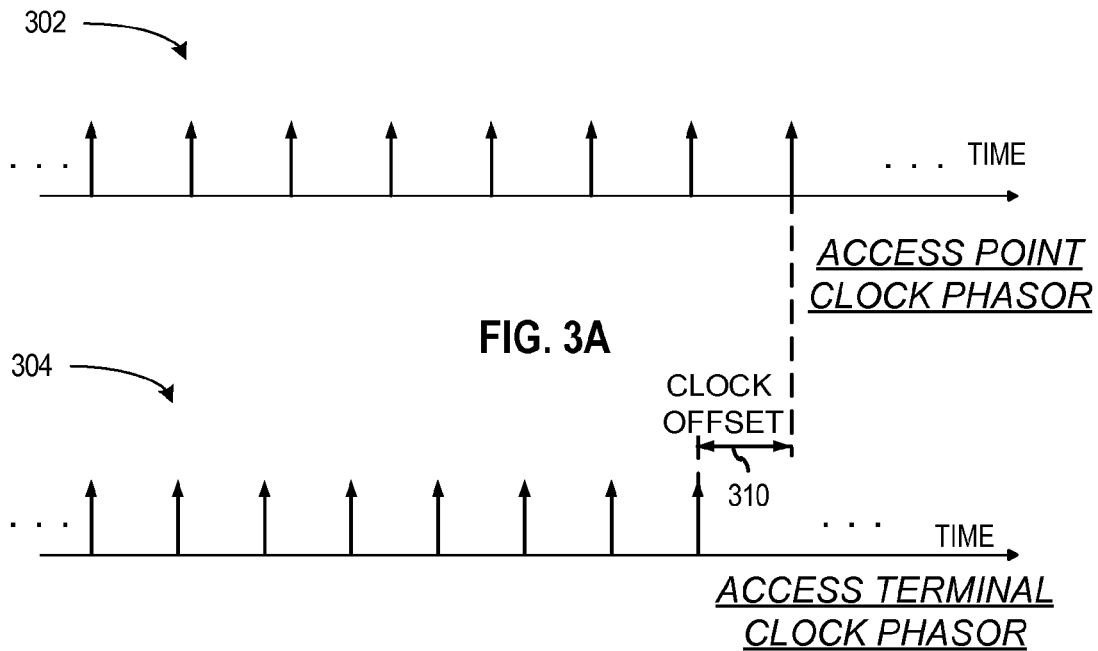
FIG. 3A
FIG. 3B
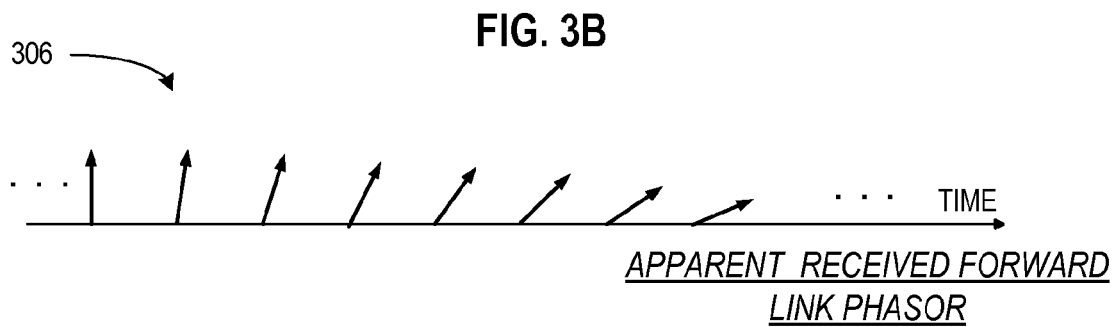
FIG. 3C
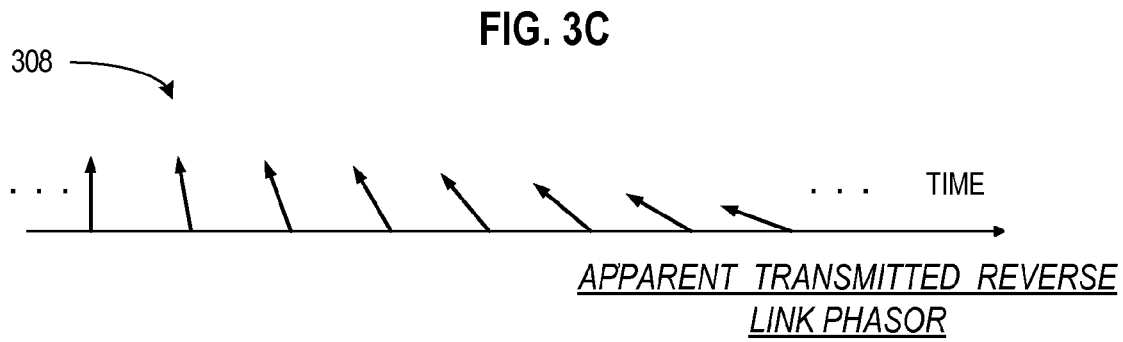
FIG. 3D

ACCESS POINT PHASOR

APPARENT FORWARD LINK
SIGNAL PHASOR

APPARENT REVERSE LINK
SIGNAL PHASOR

TIMING CORRECTION FOR TIMING/FREQ ERROR CAUSED BY MOBILE CLOCK DRIFT AS WELL AS BY MOVEMENT

TIMING ERROR OVER TIME
DUE TO MOBILE CLOCK DRIFT

TIMING ERROR OVER TIME
DUE TO MOBILE MOVEMENT

TIMING ERROR OVER TIME DUE TO
MOBILE CLOCK DRIFT AND MOVEMENT

METHOD OF ESTIMATING WIRELESS LINK
TIMING AND/OR FREQUENCY ERROR COMPONENTS

MOTION-AWARE MOBILE TIME AND FREQUENCY TRACKING

CLAIM OF PRIORITY UNDER 35 U.S.C. §119

The present Application for Patent claims priority to U.S. Provisional Application No. 61/034,347 entitled "Motion-Aware Mobile Time and Frequency Tracking", filed Mar. 6, 2008, and assigned to the assignee hereof and hereby expressly incorporated by reference herein.

BACKGROUND

1. Field

Various features pertain to wireless communication systems. At least one aspect pertains to methods for mobile time and frequency tracking and compensation at a wireless communication device.

2. Background

Wireless communication systems are widely deployed to provide various types of communication contents, such as, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications, such as, third generation partnership project (3GPP), 3GPP, long-term evolution (LTE), etc.

Generally, wireless multiple-access communication systems may simultaneously support communication for multiple access terminals (e.g., mobile devices). Each access terminal may communicate with one or more access points via transmissions on forward and reverse links. The forward link (FL or downlink) refers to the communication link from the access points to access terminals, and the reverse link (RL or uplink) refers to the communication link from the access terminals to access points. Further communications between access terminals and access points may be established via single-input single-output (SISO) systems, multiple-input single-output (MISO) systems, multiple-input multiple-output (MIMO) systems and so forth. In addition, access terminals may be capable of communicating with other access terminals (and/or access points with other access points) in peer-to-peer wireless network configurations.

Time and frequency synchronization is fundamental to performance of any mobile wireless communication system. Mobile access terminal (e.g., mobile device) clock drift and movement are two major contributors affecting mobile time and frequency synchronization. Time and frequency tracking, based on a forward link signal arriving at the mobile access terminal and a reverse link signal arriving at the access point separately, cannot differentiate between effects from mobile clock drift versus mobile movement and therefore cannot achieve the best possible synchronization. Mobile access terminal performance is thus compromised, especially when mobile access terminal movement is not negligible. Also, if a feedback-based correction scheme is utilized based on feedback from the access point, such scheme adds undesirable signaling overhead to the wireless system.

Consequently, a method is needed to improve performance of the mobile access terminal by differentiating between the effects of mobile clock drift and movement, and to lessen signaling overhead between the mobile access terminal and an access point.

SUMMARY

A method is provided for compensating for clock drift error and movement error of a mobile access terminal to adjust a receive clock and a transmit clock. A forward link timing/frequency error is obtained by the access terminal, where the forward link error is attributable to at least a first error component and a second error component. In one example, the first error component may be a clock drift error component for the access terminal and the second error component may be a movement error component for the access terminal. The forward link error may include a timing synchronization error between the access terminal and an access point with which it communicates. Additionally, the forward link error may also include a frequency synchronization error between a forward link frequency and a baseband reference frequency.

The first error component and the second error component may be estimated based on the obtained forward link timing/frequency error and/or based on characteristics of the forward link signal. Estimating the first error component and/or the second error component may be performed by at least one of a linear operation or a non-linear operation. In one example, the non-linear operation is a long-term signal averaging operation. In one example, the second error component may also be estimated based on obtained Global Positioning System information that is indicative of the movement of the access terminal.

A receive clock of the access terminal may be compensated or adjusted based on a combination of the first error component and the second error component. Compensating the receive clock may include applying a correction coefficient to the receive clock that is equal to the sum of the first error component and the second error component.

A transmit clock of the access terminal may be compensated or adjusted based on a difference between the first error component and the second error component. Compensating the transmit clock may include applying a correction coefficient to the transmit clock that is equal to the difference between the first error component and the second error component. In yet another example, compensating the transmit clock may include applying a correction coefficient to the transmit clock that is equal to the sum of a transmit correction feedback coefficient from an access point and the difference between the first error component and the second error component.

This method may be performed on a mobile access terminal hardware, software, and/or a combination thereof.

BRIEF DESCRIPTION OF THE DRAWINGS

Various features, nature and advantages may become apparent from the detailed description set forth below when taken in conjunction with the drawings in which like reference characters identify correspondingly throughout.

FIG. 2 (comprising FIGS. 2A, 2B, 2C, and 2D) are diagrams illustrating examples of the impact of clock drift on the timing synchronization between an access terminal and an access point in terms of waveform.

FIG. 3 (comprising FIGS. 3A, 3B, 3C, and 3D) are diagrams illustrating examples of the impact of clock drift to mobile synchronization in terms of phasors.

DETAILED DESCRIPTION

Figure 1:
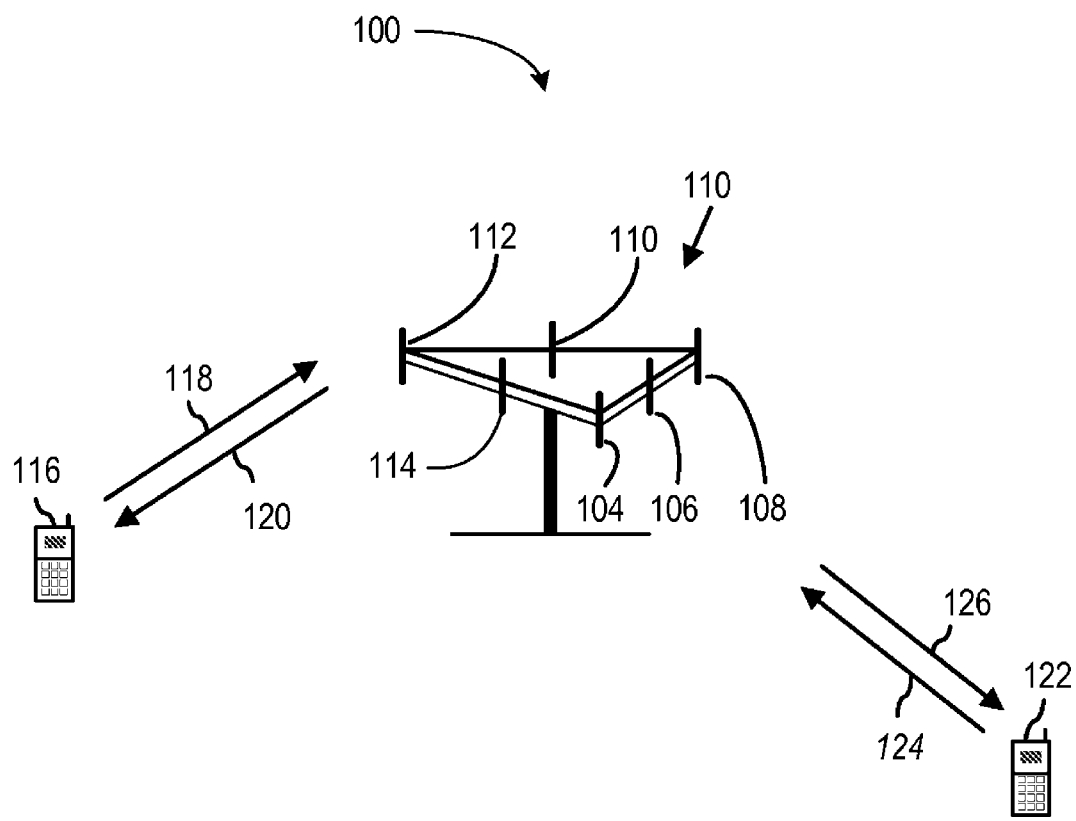
FIG. 1 is a conceptual illustration of an example of a multiple access wireless network in which a mobile access terminal implementing clock drift and movement compensation may operate.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

In the following description, certain terminology is used to describe certain features. The terms "access terminal", and "communication device" may be interchangeably used to refer to a mobile device, mobile phone, wireless terminal, access terminal and/or other types of mobile or fixed communication apparatus capable of communicating over a wireless network or system. The term "wireless network" and "communication system" may be interchangeably used to refer to over-the-air communication systems, such as a Multi-band Orthogonal Frequency Division Multiplexing (OFDM) UWB system. The term "access point" may refer to a fixed station used for communicating with the access terminals and may also be referred to as a base station, a Node B, or some other terminology.

Overview

According to one feature, an access terminal (mobile device) may be configured to estimate and/or identify clock drift and the terminal's movement to compensate its communication frequency. A forward link error is determined at the mobile terminal (e.g., by detecting a difference between the forward link and baseband), where that forward link error is attributable to a clock drift error and/or a movement error. Such "forward link error" may include a timing error and/or a frequency error that can be compensated by adjusting a transmit clock and a receive clock. This timing/frequency error is usually detected when it accumulates into a noticeable timing error at the access terminal. Consequently, timing/frequency compensation involves correcting the accumulated timing error in the transmit clock and/or receive clock.

This feature may improve access terminal synchronization by making the access terminal aware of its movement so that timely action can be taken for effective correction or compensation of its timing/frequency. The motion-aware mobile access terminal may track clock drift and frequency to compensate for errors and approach ideal transmit (Tx) and receive (Rx) synchronization performance. This approach may also minimize over-the-air feedback signaling for reverse (RL) timing correction by detecting and compensating both Rx and Tx frequency and/or timing error locally, immediately, and therefore accurately. Conventional approaches typically assume that the instantaneous effect of a mobile access terminal's movement to frequency synchronization is small and negligible relative to that of clock drift. Such simplification allows the mobile access terminal to focus on tracking clock drift estimated from the forward link signal, while relying on delayed feedback over the air for tracking mobile movement estimated from the reverse link signal at the access point.

Network Architecture

FIG. 1 is a conceptual illustration of an example of a multiple access wireless network in which a mobile access terminal implementing clock drift and movement compensation may operate. A wireless network 100 may include an access point 110 and one or more mobile access terminals 116 and 122. The access point 110 may include one or more antennas. For example, a plurality of antennas may be organized as multiple antenna groups, where a first group may include antennas 104 and 106, a second group may include antennas 108 and 110 and a third group may include antennas 112 and 114. In FIG. 1, only two antennas are shown for each antenna group, however, more or fewer antennas may be used for each antenna group. A first mobile access terminal 116 may be in communication with antennas 112 and/or 114, where antennas 112 and/or 114 may transmit information to the first mobile access terminal 116 over a forward link (FL) 120 and receive information from the first mobile access terminal 116 over a reverse link (RL) 118. A second mobile access terminal 122 may be in communication with antennas 106 and/or 108, where antennas 106 and/or 108 may transmit information to the second mobile access terminal 122 over a forward link 126 and receive information from the second mobile access terminal 122 over a reverse link 124. In a frequency division duplex (FDD) system, communication links 118, 120, 124 and 126 may use different frequencies for communication. For example, the FL 120 may use a different frequency then that used by the RL 118.

Each group of antennas and/or the area in which they are designed to communicate is often referred to as a sector of the access point. In some embodiments, each of the antenna groups is designed to communicate to access terminals (e.g., mobile devices) in a sector of an area covered by the access point 110.

During operation, a mobile access terminal may move and/or its internal clock may drift, thereby leading to timing/frequency errors (i.e., timing and frequency synchronization errors with the access point). Consequently, timing/frequency errors may be introduced as a result of clock drift, which result in accumulated timing errors at transmit and/or receive clocks for the access terminal. Additionally, timing/frequency errors may also be introduced due to a Doppler shift when the access terminal moves relative to its access point.

A timing error and/or frequency error may be determined at the mobile terminal by, for example, detecting a difference between a forward link and baseband, where the timing/frequency error is attributable to a clock drift error component and/or a movement error component. This timing/frequency synchronization error may be detected when it accumulates into a noticeable timing error (between the received forward link signal and the baseband reference signal). To compensate for these timing/frequency errors, the mobile access terminals 116 and/or 122 may be configured to identify and/or estimate error contributions from both clock drift and/or movement (e.g., due to the movement velocity/acceleration of the access terminal). The access terminal may use a receiver clock to lock on the forward link signal frequency while it may use a transmitter clock to transmit the reverse link signal.

Such timing error and/or frequency error may be compensated by adjusting a transmit clock and a receive clock of the mobile access terminal. Consequently, timing and/or frequency synchronization with an access point may be achieved by correcting or adjusting for the accumulated timing error in the transmit clock and/or receive clock.

Clock Drift Error

Clock drift refers to the condition where a first clock does not run at the exact same speed as compared to a second clock. A clock may drift differently depending on its quality, the exact power it gets from its power source, the surrounding temperature and other environmental variables. Thus, the same clock can have different clock drift rates at different occasions. Consequently, after some time the first clock "drifts apart" from the second clock. For instance, a first clock used by an access terminal may drift apart from a second clock used an access point, thereby causing transmissions to between the access terminal and access point to become unsynchronized. This difference between two clocks is referred to as a "clock drift error" and leads to an accumulated timing error at the mobile access terminal. The accumulated timing error in the transmit and/or receive clock(s) of the access terminal is relative to receive and/or transmit clocks of an access point with which the access terminal communicates.

FIG. 2 (comprising FIGS. 2A, 2B, 2C, and 2D) are diagrams illustrating examples of the impact of clock drift on the timing synchronization between an access terminal and an access point. Clock drift causes transmit and receive timing to move apart. FIG. 2A is diagram 202 that illustrates a first clock for an access point. FIG. 2B is diagram 204 that illustrates a second clock for an access terminal. In the given example the access terminal second clock (FIG. 2B) is faster than the access point first clock (FIG. 2A). In this example, a clock drift error $\Delta_1$ is shown between the first and second clocks. Due to the clock drift, this difference between clocks may increment to a clock drift error $\Delta_2$ as time passes.

FIG. 2C is a diagram 206 that illustrates the timing of a forward link signal as perceived at the access terminal. FIG. 2D is a diagram 208 that illustrates the timing of a reverse link signal as transmitted by the access terminal. The faster second clock (204 FIG. 2B) makes the received forward link (FL) signal (206 in FIG. 6C) seem slower than it really is, requiring the access terminal to slow down its receiver clock. Meanwhile, the faster access terminal clock (FIG. 2B) makes the transmitted reverse link (RL) signal (208 FIG. 2D) arrive faster at the access point, requiring access terminal to slow down its transmitter clock. Consequently, as time passes, a clock drift error $\Delta_3$ between the forward link and reverse link signals increases to a greater clock drift error $\Delta_4$. Such timing error causes the access terminal clock(s) to be out of synchronization with the access point. Therefore, timing correction may be performed at the access terminal to synchronize its transmit and/or receive clock(s) with the access point.

Similar to the timing corrections (FIG. 2), frequency corrections may also be implemented to maintain synchronization in the presence of clock drift (e.g., local clock or oscillator causes a frequency error) and/or Doppler shift (e.g., due to the motion of the access terminal relative to the access point).

FIG. 3 (comprising FIGS. 3A, 3B, 3C, and 3D) are diagrams illustrating examples of the impact of clock drift to mobile synchronization in terms of phasors. FIG. 3A is diagram 302 that illustrates an access point clock phasor. FIG. 3B is diagram 304 that illustrates an access terminal clock phasor. A clock offset 310 shows that the access terminal clock is faster the access point clock. This frequency offset/error 310 shows up as a rotation of the received signal phasor, as shown in diagrams 306 and 308. That is, the forward link signal is perceived by the access terminal as lagging in phase, requiring the access terminal to slow down its receiver clock. Similarly, the reverse link signal is perceived by the receiving access point as leading in phase, requiring the access terminal to slow down its transmitter clock.

To correct for the clock drift error (illustrated in FIGS. 2 and 3) an access terminal may compensate or adjust its transmit clock and/or receive clock in the same direction by a correction amount A.

Access Terminal Movement Error

Figure 4A:
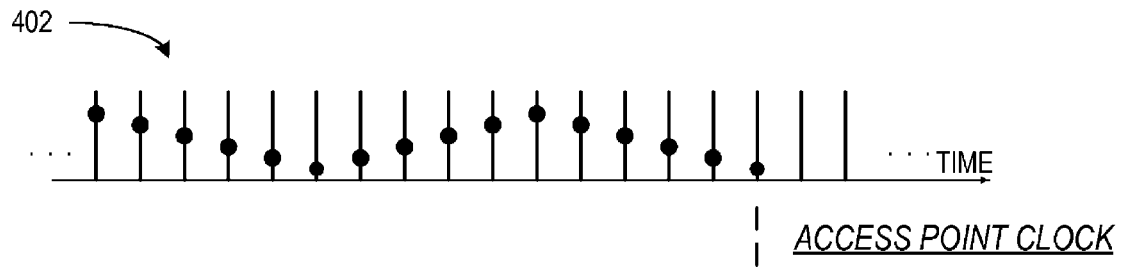
FIG. 4 (comprising FIGS. 4A, 4B, and 4C) are diagrams that illustrate the impact of the access terminal movement to timing synchronization between an access terminal and an access point in terms of waveform.
Figure 4B:
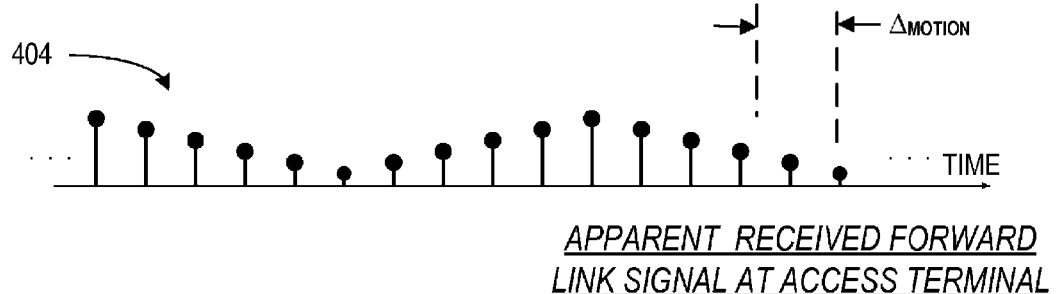
Figure 4C:
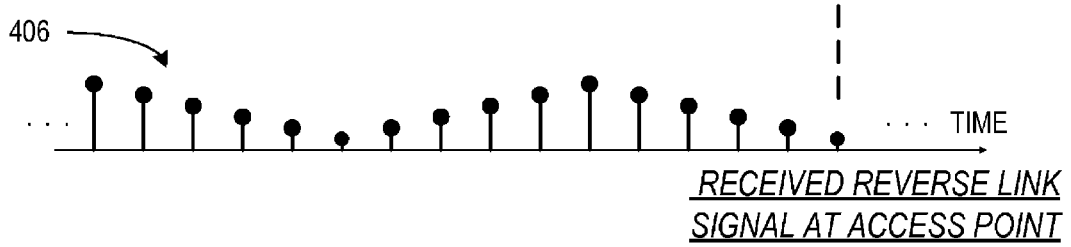

FIG. 4 (comprising FIGS. 4A, 4B, and 4C) are diagrams that illustrate the impact of the access terminal movement to timing synchronization between an access terminal and an access point in terms of waveform. FIG. 4A illustrates an access point clock and signal (e.g., signal amplitude) 402. As the access terminal moves away from the access point, this movement causes the received forward link signal 404 to be perceived as slower than it really is (e.g., a difference of $\Delta_{MOTION}$), requiring the access terminal to slow down its receiver clock. Likewise, as the access terminal moves away from the access point, this movement causes the reverse link signal 406 to be perceived as slower (as received at the access point) than it really is, requiring the access terminal to speed up its transmitter clock. In this case, the access terminals may apply opposite correction to its receiver clock versus its transmitter clock. That is, the receiver clock (e.g., forward link) may be compensated by an amount B while the transmit clock (e.g., reverse link) is compensated by an amount −B.

Figure 5A:
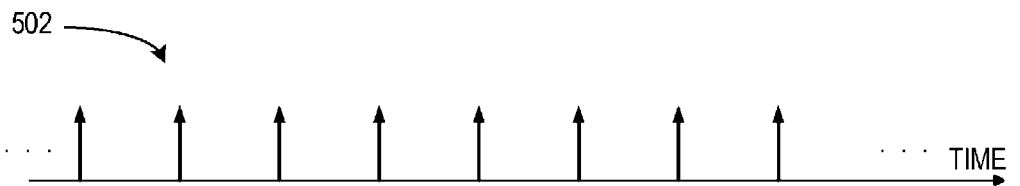
FIG. 5 (comprising FIGS. 5A, 5B, and 5C) illustrates diagrams showing the impact of a mobile access terminal movement to mobile synchronization in terms of phasors.
Figure 5B:
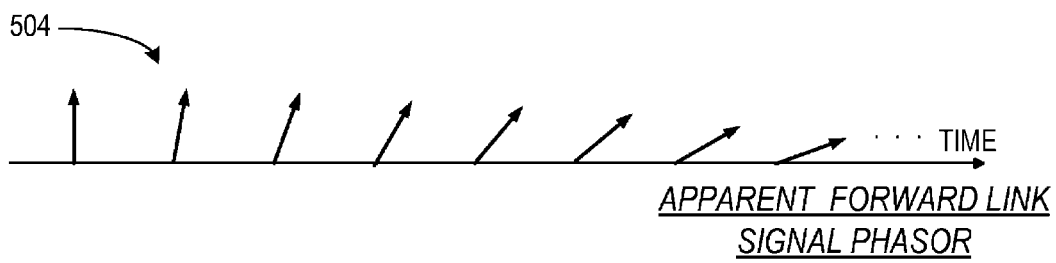
Figure 5C:
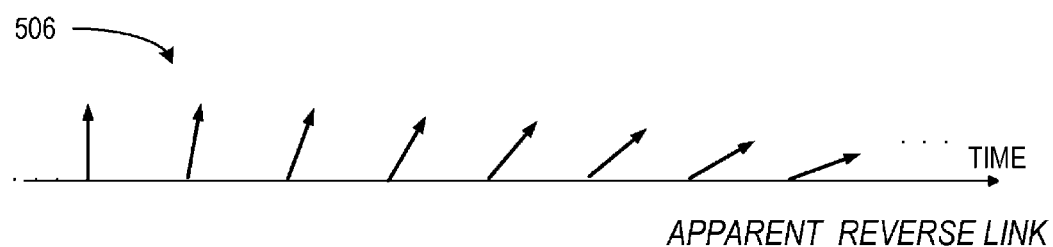

FIG. 5 (comprising FIGS. 5A, 5B, and 5C) illustrates diagrams showing the impact of a mobile access terminal movement to mobile synchronization in terms of phasors. FIG. 5A is diagram 502 that illustrates an access point clock phasor. FIG. 5B is diagram 504 that illustrates a case where the mobile access terminal is speeding away from the access point, making a received forward link signal (as perceived by the access terminal) appearing to come at a lower frequency than the access terminal receiver clock. Consequently, the access terminal has to slow its receiver clock. FIG. 5C is diagram 506 that illustrates a case where the mobile access terminal is moving away from the access point, making a transmitted reverse link signal seem to come at lower frequency (as perceived by the receiving access point) than mobile access terminal transmitter clock. Thus, the access terminal has to speed up its transmitter clock. Consequently, the timing/frequency errors introduced due to Doppler shift (as the access terminal moves relative to its access point) are compensated by compensating the transmitter and receiver clocks in the opposite direction.

Clock Drift and Movement Compensation

The performance of conventional mobile time tracking approach depends on the split between a locally estimated immediate correction to the transmit (Tx) clock and the receive (Rx) clock, and a remotely estimated and delayed correction to the transmit (Tx) clock (denoted as b), as well as the amount and characteristics of time varying mobile movement as shown in Table 1.

TABLE 1

| Clocks | Ideal estimate of timing/frequency error | Conventional Approach 1: Estimate of timing/frequency error includes clock drift and movement | Conventional Approach 2: Estimate of timing/frequency error includes only clock drift |
|---|---|---|---|
| Rx | A + B | A + B | A |
| Tx | A − B | A + B − 2b | A − b |

A: Mobile frequency synchronization error due to clock drift
B: Mobile frequency synchronization error due to movement
b: RL Rx synchronization error residual estimated at access point To account accurately for mobile clock drift as well as movement, the ideal correction coefficient to the receiver clock is (A+B), while the ideal correction coefficient for the transmit clock is (A−B), where A is the clock drift error correction value and B is the movement error correction value. This ideal correction is not achievable in reality with conventional methods.

In a first conventional method, a mobile access terminal is able to estimate (A+B) from the forward link (FL) signal resulting in full correction (A+B) to receive (Rx) clock. In this case, the transmit (Tx) clock suffers the maximum possible error by the amount of −2B and relies on a delayed feedback signal from the access point for correction of −2b. Although it is possible for the feedback correction factor −2b to be very close to −2B, the correction is delayed at the cost of excessive reverse link performance degradation by order of (2B), instead of (B) in terms of magnitude, plus the overhead bandwidth.

In a second conventional method, the access terminal movement error is ignored. A mobile access terminal ends up with an estimate (A) for clock drift error. The transmit clock is adjusted with the help of a delayed remote feedback correction −b from the access point, while the receive clock suffers a maximum error B. It may seem possible to correct the receive clock synchronization by (A+b), but it would be realistically difficult, given that the mobile estimate of time/frequency error from forward link signal may be a time varying function between the two extremes of (A+B) and (A) depending on the characteristics of the movement error correction B and the estimation algorithm.

In practice, mobile time/frequency tracking performance of conventional method could be anywhere between the two extreme cases of the first approach and second approach, always short of ideal performance, with degradation split between transmit and receive synchronization. Except when the mobile access terminal is completely or nearly stationary (in which case B=0), the tracking performance gets worse as B increases.

The fundamental problem with the conventional approaches to time/frequency tracking and correction is that the mobile access terminal is leaving motion-awareness completely to the access point.

Figure 6:
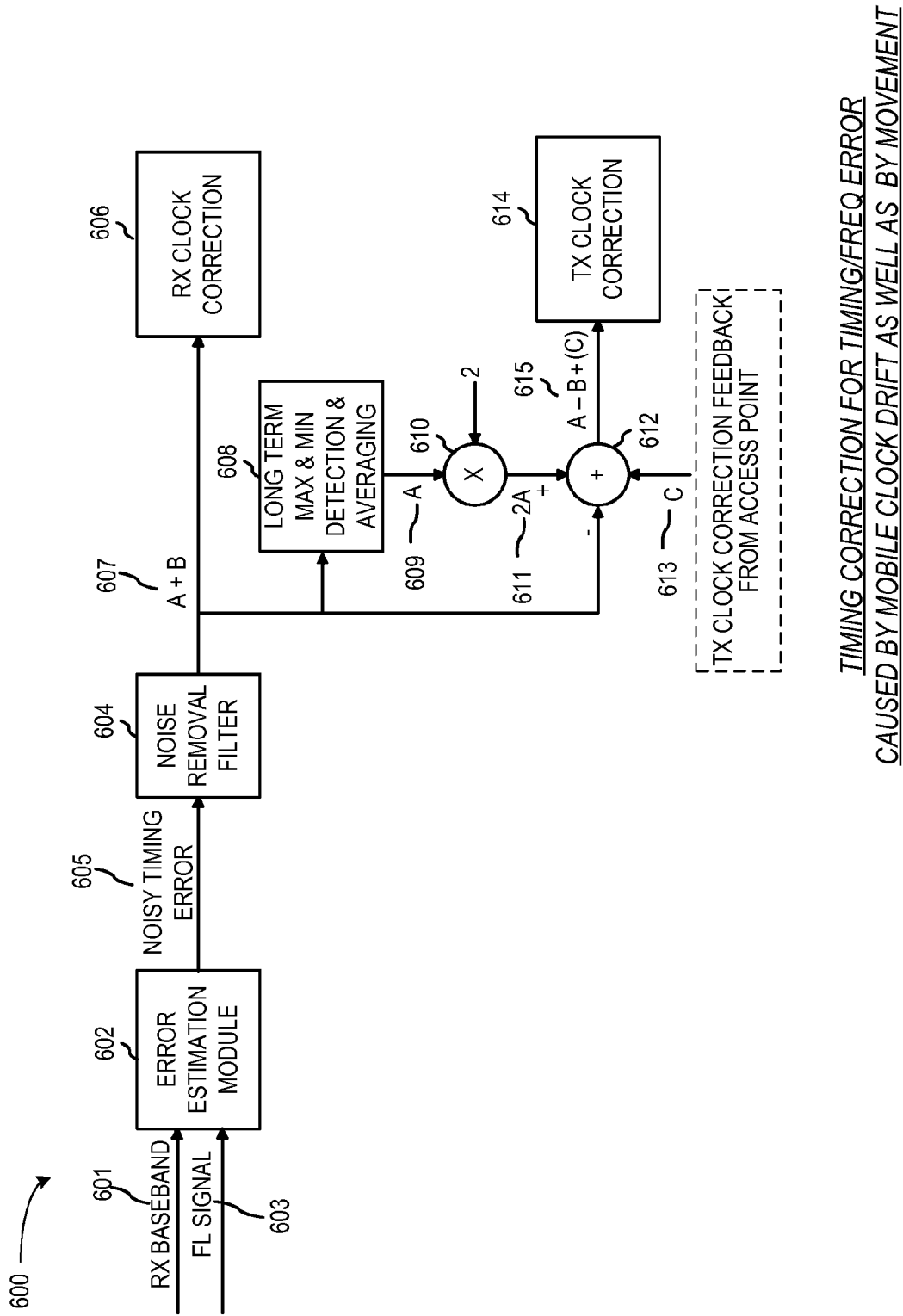
FIG. 6 is a block diagram illustrating functional components of a mobile access terminal that may be configured to perform timing and frequency correction resulting from a drift clock error and a movement error.

FIG. 6 is a block diagram illustrating functional components of a mobile access terminal that may be configured to perform timing/frequency correction resulting from a drift clock error and a movement error. The approach illustrated in FIG. 6 overcomes the limitation of the conventional approaches by introducing a technique to separate the clock drift error portion of the timing/frequency error from the mobile movement error portion.

In this example, the mobile access terminal 600 may include an error estimation module 602 that may obtain a receiver baseband signal 601 and a forward link signal 603 and use them to determine a noisy timing error 605 (e.g., corresponding to an estimated timing/frequency error between the receive baseband 601 and forward link signal 603). The receiver baseband signal 601 may be generated using the access terminal's receive clock. This timing/frequency error estimate 605 includes both a clock drift error component and a mobile movement error component. A noise removal filter 604 filters timing error due to noise out using, for example, a low pass linear filter resulting in an estimated correction factor of (A+B) 607. A receive clock correction module 606 compensates the access terminal's receive clock using the correction factor (A+B) 607. A long term maximum and minimum detection and averaging module 608 performs long-term averaging of the estimated correction factor A+B 607, resulting in a long-term average correction coefficient of A 609. The long term maximum and minimum detection and averaging functions may be based on the observations of the characteristics of the clock drift error and movement error as illustrated in FIG. 7.

At a multiplier 610, the long-term average correction coefficient A 609 is multiplied by a factor of two (2). The correction coefficient (A+B) 607 is then subtracted from the sum of the long-term average correction coefficient 2A 611 and a transmit clock correction value C 613. A transmit clock correction module 614 applies the resulting transmit clock correction factor (A−B+C) 615 to the access terminal's transmit clock. Note that, addition of the transmit clock correction value C 613 is optional and may be based, in one example, on a feedback signal from an access point.

It should be noted that in practice, the transmit and receive clock compensations may be achieved either by directly correcting the mobile clock source e.g. voltage controlled crystal oscillator (VCTCXO) or indirectly by adding/dropping samples (for timing correction) and rotating/derotating phasors using a numerically controlled oscillator (NCO) (for frequency corrections).

The above techniques also works to separate sudden changes in the timing offset and Doppler shift effect, when the mobile device is handed-off from one access point to another. Furthermore, by applying this correction locally (at the access terminal), when the mobile access terminal reverse link switches to a new access point it results in less correction from the new access point.

An optional technique may include the use of a location positioning device such as Global Positioning System (GPS). The GPS can accurately track mobile movement. The movement component A 609 of the timing/frequency error may be estimated based on Global Positioning System information that is indicative of the movement of the mobile access terminal.

Figure 7A:
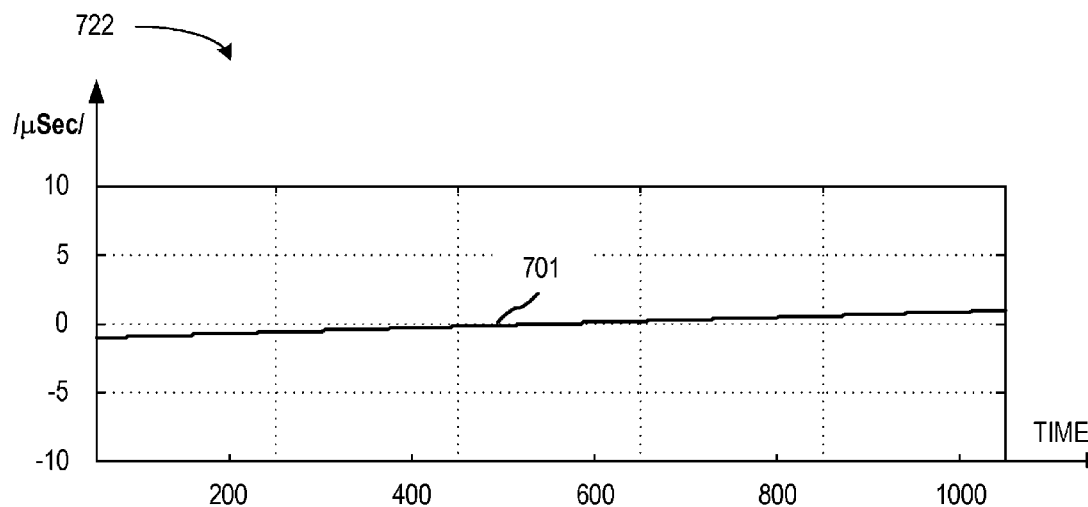
FIG. 7 (comprising FIGS. 7A, 7B, and 7C) illustrate characteristics exhibited on the forward link due to clock drift error and movement error of an access terminal.
Figure 7B:
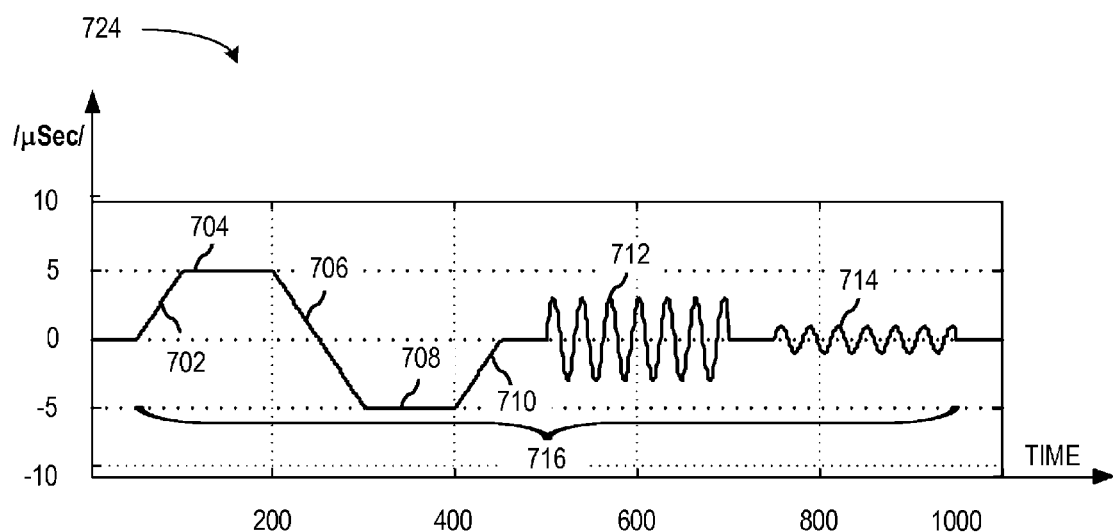
Figure 7C:
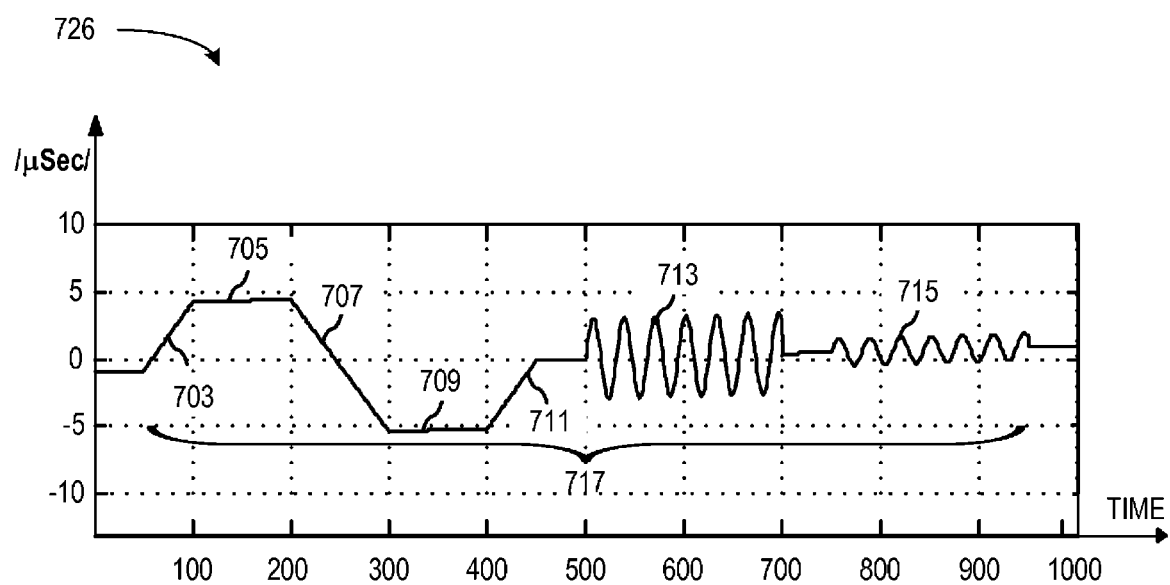

FIG. 7 (comprising FIGS. 7A, 7B, and 7C) illustrate characteristics exhibited on the forward link due to clock drift error and movement error of an access terminal. FIG. 7A is a diagram 722 that illustrates timing error 701 (perceived by the mobile access terminal on the forward link) over time due to mobile clock drift. Note that the timing error line 701 slopes over time, indicating a clock drift. FIG. 7B is a diagram 724 that illustrates potential characteristics of the forward link over time due to movement of the access terminal. Timing errors 716 corresponding to movement of the access terminal may be identified by various forward link characteristics (illustrated as segments 702, 704, 706, 708, 712, and 714). For instance, segment 702 (from around time tick 50 to 100) may represent a mobile access terminal that is starting and speeding up (accelerating) from the access point. Segment 704 (from around time tick 100 to 200) may represent the mobile access terminal moving steadily away from an access point. Segment 706 (from around time tick 200 to 300) may represent the mobile access terminal turning around 180 degrees (e.g., moving toward the access point) and accelerating toward the access point. Segment 708 (from around time tick 300 to 400) may represent the mobile access terminal moving steadily (not accelerating) towards the access point. Segment 710 (from time tick 400 to 450) may represent the mobile access terminal slowing down and stopping. Segment 712 (from around time tick 500 to 700) may represent the mobile access terminal quickly moving around the access point (e.g., circling around the access point at a fast speed). Segment 714 (from around time tick 800 to 1000) may represent the mobile access terminal slowly moving around the access point (e.g., circling around the access point at a slow speed).

FIG. 7C is a diagram 726 illustrating potential timing error characteristics of the forward link over time due to both clock drift and access terminal movement. Timing errors 717 may be the combinations of timing error 701 of FIG. 7A and timing error 716 of FIG. 7B. More specifically, timing error 703 may be the sum of timing errors 701 and 702. Timing error 705 may be the sum of timing errors 701 and 704. Timing error 707 may be the sum of timing errors 701 and 706. Timing error 709 may be the sum of timing errors 701 and 708. Timing error 711 may be the sum of timing errors 701 and 710. Timing error 713 may be the sum of timing errors 701 and 712. Timing error 715 may be the sum of timing errors 701 and 714.

From the above diagrams, it can be concluded that frequency errors caused by mobile clock drift versus mobile movement exhibit different characteristics (as perceived on the forward link signal) and may be separated as described in regard to FIG. 6. Once such separation is performed, correction of the mobile receive clock by coefficient A+B 607 and correction of mobile transmit clock by coefficient A−B 615 may be applied.

To determine the error caused by the relative movement of the mobile access terminal relative to the access point, various techniques may be employed. For example, in segments 713 and 715 when a mobile access terminal is moving around an access point at either driving or walking speed, linear filtering with proper bandwidth may allow extraction of the frequency error corresponding to clock drift, as a low frequency component. In segments, 705 and 709 of FIG. 7C the frequency error from sustained steady mobile device movement has similar characteristics as that from clock drift, thereby making it difficult to separate the two with linear filtering. To estimate the frequency error associated with clock drift, a linear and/or non-linear operation, such a averaging of long-term maximum and minimum of frequency errors, may be used. In order for the long-term averaging to work, the long-term distribution of the movement error B is expected to be symmetrical with zero mean. The same averaging of long-term maximum and minimum frequency errors may also works for segments 713 and 715.

Figure 8:
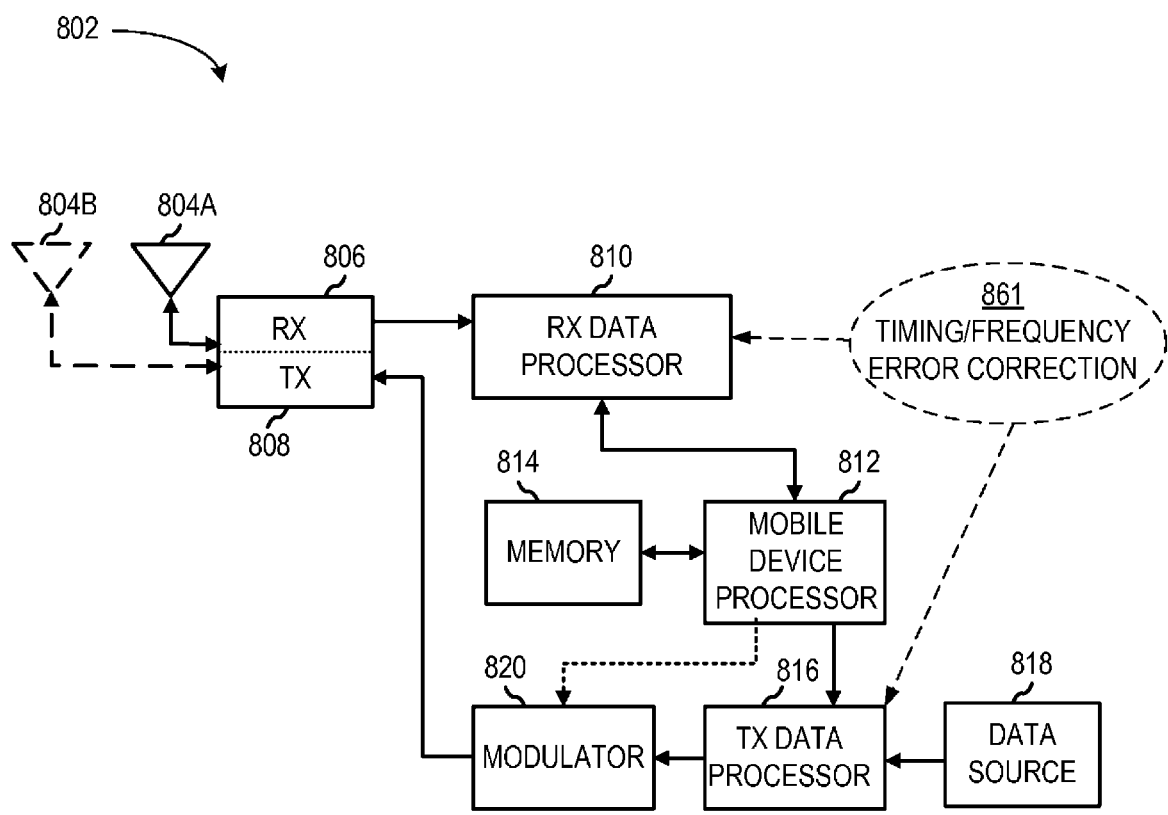
FIG. 8 is a block diagram of an example of mobile access terminal that may be configured to identify and/or compensate for clock drift and/or movement to reduce timing and/or frequency errors in a communication link with an access point.

FIG. 8 is a block diagram of an example of mobile access terminal that may be configured to identify and/or compensate for clock drift and/or movement to reduce timing/frequency errors in a communication link with an access point. At the mobile access terminal 802, transmitted modulated signals (e.g., from an access point) are received by a receive antenna 804A and the received signal from the antenna 804A is provided to a receiver (RX) 806. The receiver 806 may condition (e.g., filters, amplifies, and downconverts) the respective received signal, digitize the conditioned signal to provide samples, and further process the samples to provide a corresponding "received" symbol stream. In some implementations, the mobile access terminal 802 may include additional antennas 804B and/or receiver/transmitter chains.

A receive data processor 810 may then receive and/or process the received symbol streams from the receiver 806 based on a particular receiver processing technique to provide "detected" symbol streams. The receive data processor 810 then demodulates, deinterleaves and/or decodes each detected symbol stream to recover the traffic data for data stream. Each detected symbol stream may include symbols that are estimates of the modulation symbols transmitted (by the access point). Processing by the receive data processor 810 is complementary to that performed by a transmit data processor at an access point (e.g., 110 in FIG. 1). The receive data processor 810 may also estimate a timing and/or frequency error correction information, and provides this information to a mobile device processor 812.

The mobile device processor 812 may be coupled to a memory device 814 that maintains decoding information. The mobile device processor 812 may receive a plurality of data streams, from the receive data processor 810, store such data streams in the memory device 814, and/or provide the data streams to corresponding applications operating on the mobile device processor 812.

Additionally, a transmit data processor 816 may receive traffic data from a number of data streams from a data source 818. The traffic data may be modulated by modulator 820 and conditioned by a transmitter 808 prior to transmission over the antenna 804A.

The receive data processor 810, mobile device processor 812, and/or transmit data processor 816 may operate alone or in combination to identify, obtain, and/or estimate a timing/frequency error from a forward link from an access point to the access terminal and locally determine compensation factors due to clock drift and movement of the access terminal. For example, the processors 810, 812, and/or 816 may perform one or more of the functions of FIGS. 6, 9, 10, and 11. In one example, the receive data processor 810 may be configured to identify or estimate a drift clock error component A and a movement error component B and compensate the receive clock of the access terminal. The drift clock error component A and the movement error component B may be provided to the transmit data processor 816 to compensate the transmit clock. By compensating the transmit and receive clocks, the access terminal is able to synchronize its timing and/or frequency with that of the access point with which it communicates.

Figure 9:
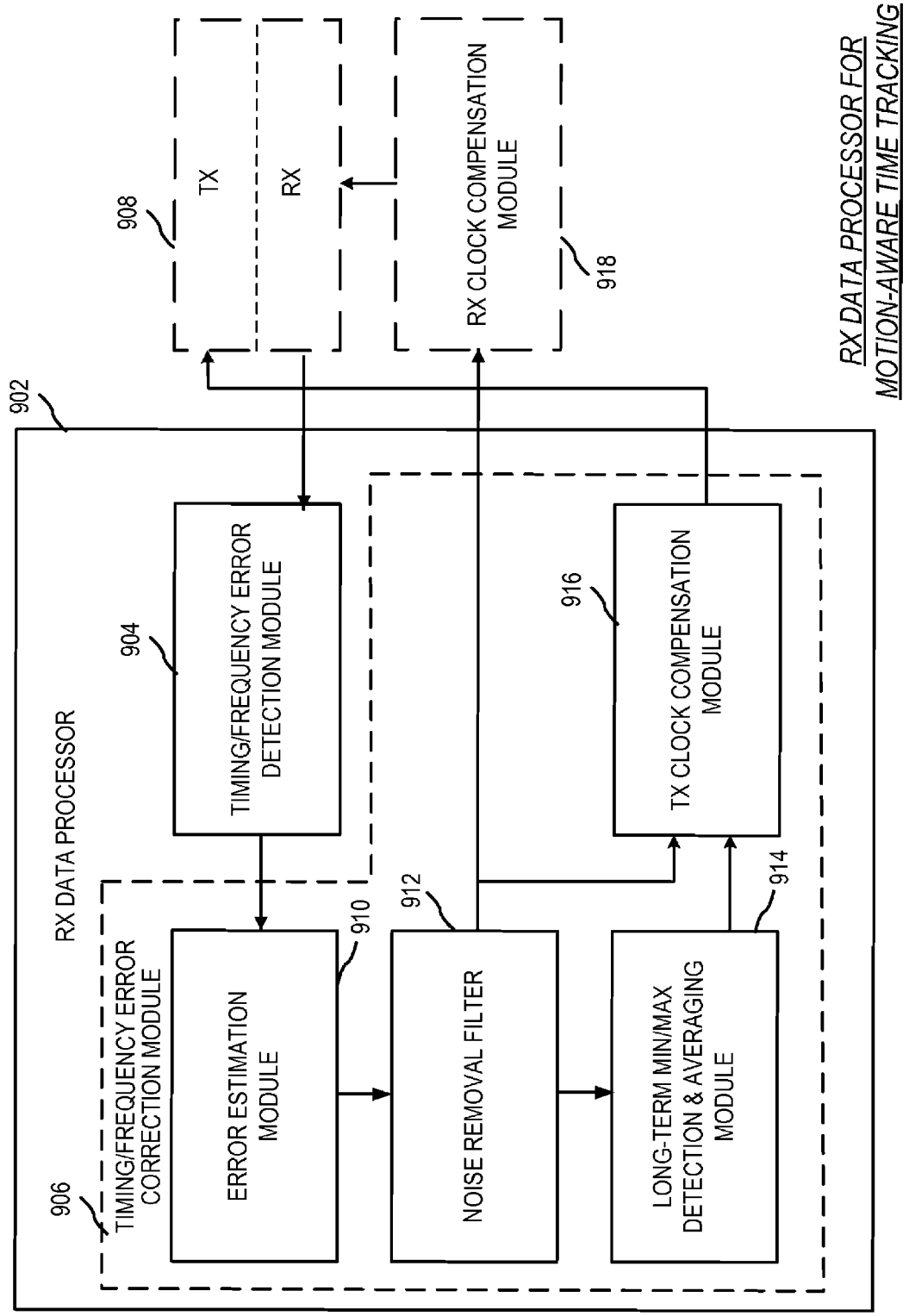
FIG. 9 is a block diagram of receive data processor configured to perform motion-aware timing and/or frequency tracking based on distinguishing a clock drift error component and a movement error component.

FIG. 9 is a block diagram of receive data processor configured to perform motion-aware timing/frequency error tracking based on distinguishing a clock drift error component and a movement error component. The receive data processor 902 may include a timing/frequency error detection module 904 and clock error correction module 906. The timing/frequency error detection module 904 may operate on forward link signals received via a transceiver 908. For example, a frequency error may be converted into a corresponding timing error that can be used to compensate the access terminal's transmit and/or receive clocks so that the observed frequency error can be minimized. The timing/frequency error correction module 906 may communicate with the timing/frequency error detection module 904 to receive a perceived, estimated, or measured timing/frequency error between the forward link signal and a receiver baseband signal. This timing/frequency error may be compensated by adjusting the receive clock and/or transmit clock for the access terminal. The timing/frequency error correction module 906 may include a timing/frequency error estimation module 910, a noise removal filter 912, a long-term Minimum Maximum detection and averaging module 914, and transmit clock compensation module 916. The error estimation module 910 may determines timing/frequency errors, including errors due to both mobile clock drift and mobile movement. The noise removal filter 912 may remove noise from timing/frequency error determined by the error estimate module 910. The noise removal filter 912 may provide timing/frequency errors that include both the mobile clock drift and mobile movement in relation to receive clock compensation module 918. The long-term Min-Max detection and averaging module 914 processes the noise-free timing/frequency errors to obtain a mobile clock drift error and mobile movement error. The transmit clock compensation module 916 determines the correction by subtracting mobile timing/frequency error due to mobile movement from that of mobile clock drift.

Figure 10:
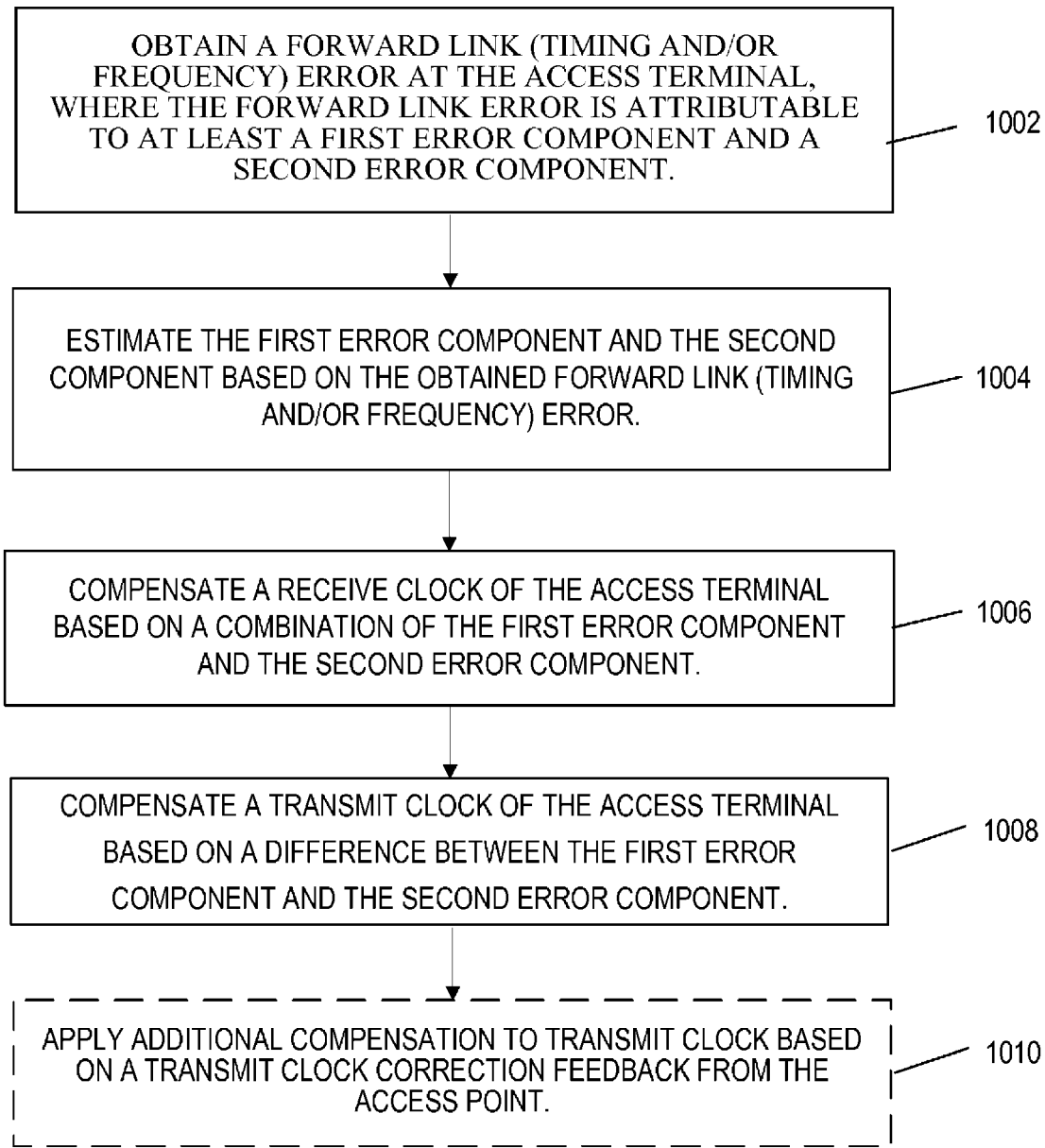
FIG. 10 is a flow chart illustrating a method operational in an access terminal to compensate a forward link frequency and/or reverse link frequency for clock drift and movement.

FIG. 10 is a flow chart illustrating a method operational in an access terminal to compensate a forward link frequency and/or reverse link frequency for clock drift and movement. A forward link timing/frequency error is obtained by the access terminal, where the forward link error is attributable to at least a first error component and a second error component 1002. In one example, the first error component may be a clock drift error component for the access terminal and the second error component may be a movement error component for the access terminal.

The first error component and the second error component may be estimated based on the obtained forward link timing/frequency error 1004. For instance, the first error component and/or the second error component may be based on characteristics of the forward link signal (e.g., FIG. 7). The forward link error may include a timing synchronization error between the access terminal and an access point with which it communicates. Additionally, the forward link error may also include a frequency synchronization error between a forward link frequency and a baseband reference frequency.

Estimating the first error component and the second error component may be performed by at least one of a linear operation or a non-linear operation. In one example, the non-linear operation is a long-term signal averaging operation. In one example, the second error component may also be estimated based on obtained Global Positioning System information that is indicative of the movement of the access terminal.

A receive clock of the access terminal may be compensated or adjusted based on a combination of the first error component and the second error component 1006. Compensating the receive clock may include applying a correction coefficient to the receive clock that is equal to the sum of the first error component and the second error component. Consequently, the receive frequency used in the forward link from an access point is adjusted.

A transmit clock of the access terminal may be compensated or adjusted based on a difference between the first error component and the second error component 1008. Compensating the transmit clock may include applying a correction coefficient to the transmit clock that is equal to the difference between the first error component and the second error component. Consequently, the transmit frequency used in a reverse link with the access point is adjusted.

In an alternative example, additional compensation may be applied to the transmit clock based on a transmit clock correction feedback from an access point 1010. For example, compensating the transmit clock may include applying a correction coefficient to the transmit clock that is equal to the sum of a transmit correction feedback coefficient from an access point and the difference between the first error coefficient and the second error coefficient.

Figure 11:
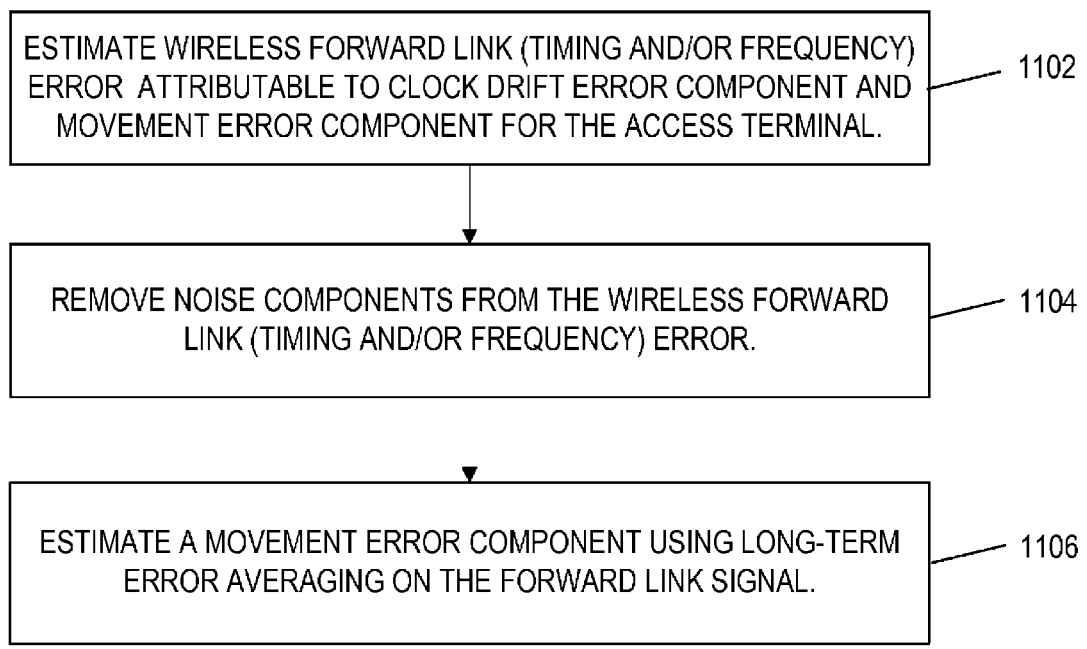
FIG. 11 illustrates an example of a method for estimating forward link timing and/or frequency error components.

FIG. 11 illustrates an example of a method for estimating forward link timing/frequency error components. The access terminal may estimate a wireless forward link timing/frequency error attributable to the clock drift error component and the movement error component for the access terminal 1102. The access terminal may then remove noise components from wireless forward link timing/frequency error 1104. Lastly, the access terminal may estimate the movement error component using long-term error averaging on the forward link signal 1106.

It should be noted that the configurations herein may have been described as a process depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function, or the main function.

In one or more examples and/or configurations, the functions described may be implemented in hardware, software, firmware or any combinations thereof When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other, optical disk storage, magnetic disk storage or other magnetic storage devices, or any other medium that can be used to carry or store desired program code means in the form of instructions or data structures and that can be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also to be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine-readable mediums for storing information.

Furthermore, configurations may be implemented by hardware, software, firmware, middleware, microcode or any combinations thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded or transmitted via any suitable means including memory sharing, message passing, token passing, network transmission, etc.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes, such as, in accordance with a signal having one or more data packets (e.g., data from one component interacting with another component in a local system, distributed system, and/or across a network such as the Internet with other systems by way of the signal).

One or more of the components, steps, and/or functions illustrated in FIGS. 1, 2, 3, 4, 5, 6, 7, 8, 9, 10 and/or 11 may be rearranged and/or combined into a single component, step, or function or embodied in several components, steps, or functions without affecting the operation of the pseudo-random number generation. Additional elements, components, steps and/or functions may also be added without departing from the invention. The apparatus, devices, and/or components illustrated in FIGS. 1, 6, 8 and/or 9 may be configured to perform one or more of the methods, features, or steps described in FIGS. 7, 10 and/or 11. The novel algorithms described herein may be efficiently implemented in software and/or embedded hardware.

Those of skill in the art would further appreciate that the various illustrative logical blocks, modules, circuits and algorithm steps described in connection with the embodiments disclosed herein may be implemented as electronic hardware, computer software or combinations of both. To illustrate clearly this interchangeability of hardware and software, various illustrative components, blocks, modules, circuits and steps have been described above generally in terms of their functionality. Whether such functionality is implemented as hardware or software depends upon the particular application and design constraints imposed on the overall system.

The various features of the invention described herein can be implemented in different systems without departing from the invention. For example, some implementations of the invention may be performed with a moving or static communication device (e.g., access terminal) and a plurality of mobile or static access points (e.g., access points).

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method used by an access terminal, comprising:
    obtaining a forward link error attributable to at least a first error component and a second error component;
    compensating a receive clock of the access terminal based on a combination of the first error component and the second error component; and
    compensating a transmit clock of the access terminal based on a difference between the first error component and the second error component.

2. The method of claim 1, further comprising:
    estimating the first error component and the second error component based on the obtained forward link error.

3. The method of claim 2, wherein the first error component and the second error component are estimated based on characteristics of a forward link signal.

4. The method of claim 2, wherein estimating the first error component and the second error component is performed by at least one of a linear operation or a non-linear operation.

5. The method of claim 4, wherein the non-linear operation is a long-term signal averaging operation.

6. The method of claim 2, wherein the second error component is estimated based on obtained Global Positioning System information that is indicative of the movement of the access terminal.

7. The method of claim 1, wherein the first error component is a clock drift error component for the access terminal and the second error component is a movement error component for the access terminal.

8. The method of claim 1, wherein the forward link error includes a timing synchronization error between the access terminal and an access point with which it communicates.

9. The method of claim 1, wherein the forward link error includes a frequency synchronization error between a forward link frequency and a baseband reference frequency.

10. The method of claim 1, wherein compensating the receive clock includes
    applying a correction coefficient to the receive clock that is equal to the sum of the first error component and the second error component.

11. The method of claim 1, wherein compensating the transmit clock includes
    applying a correction coefficient to the transmit clock that is equal to the difference between the first error component and the second error component.

12. The method of claim 1, wherein compensating the transmit clock includes
    applying a correction coefficient to the transmit clock that is equal to the sum of a transmit correction feedback coefficient from an access point and the difference between the first error component and the second error component.

13. An access terminal comprising:
    a receive clock and a transmit clock;
    a frequency error detection module for obtaining a forward link error attributable to at least a first error component and a second error component;

a receive clock compensation module for compensating the receive clock of the access terminal a combination of the first error component and the second error component; and a transmit clock compensation module for compensating the transmit clock of the access terminal based on a difference between the first error component and the second error component.

14. The access terminal of claim 13 further comprising:

an error estimation module for estimating the first error component and the second error component based on the obtained forward link error.

15. The access terminal of claim 14, wherein the first error component and the second error component are estimated based on characteristics of a forward link signal and a baseband signal.

16. The access terminal of claim 14, wherein estimating the first error component and the second error component is performed by at least one of a linear operation or a non-linear operation.

17. The access terminal of claim 16, wherein the non-linear operation is a long-term signal averaging operation.

18. The access terminal of claim 13, wherein the second error component is estimated based on obtained Global Positioning System information that is indicative of the movement of the access terminal.

19. The access terminal of claim 13 wherein the first error component is a clock drift error component for the access terminal and the second error component is a movement error component for the access terminal.

20. The access terminal of claim 13, wherein the forward link error includes a timing synchronization error between the access terminal and an access point with which it communicates.

21. The access terminal of claim 13, wherein the forward link error includes a frequency synchronization error between a forward link frequency and a baseband reference frequency.

22. The access terminal of claim 13, wherein the receive clock compensation module is further configured to apply a correction coefficient to the receive clock that is equal to the sum of the first error component and the second error component.

23. The access terminal of claim 13, wherein the transmit clock compensation module is further configured to apply a correction coefficient to the transmit clock that is equal to the difference between the first error component and the second error component.

24. The access terminal of claim 13, wherein the transmit clock compensation module is further configured to apply a correction coefficient to the transmit clock that is equal to the sum of a transmit correction feedback coefficient from an access point and the difference between the first error component and the second error component.

25. An access terminal, comprising:

means for obtaining a forward link error attributable to at least a first error component and a second error component;

means for compensating a receive clock of the access terminal based on a combination of the first error component and the second error component; and means for compensating a transmit clock of the access terminal communication device based on a difference between the first error component and the second error component.

26. The access terminal of claim 25, further comprising:

means for estimating the first error component and the second error component based on the obtained forward link error.

27. The access terminal of claim 26, wherein the first error component and the second component are estimated based on characteristics of a forward link signal and a baseband signal.

28. The access terminal of claim 25, wherein the forward link error includes a timing synchronization error between the access terminal and an access point with which it communicates.

29. The access terminal of claim 25, wherein the forward link error includes a frequency synchronization error between a forward link frequency and a baseband reference frequency.

30. The access terminal of claim 25, wherein the first error component is a clock drift error component for the access terminal and the second error component is a movement error component for the access terminal.

31. A non-transitory machine-readable medium comprising instructions used by an access terminal for adjusting synchronization with an access point, which when executed by one or more processors causes the processors to:

obtain a forward link error attributable to at least a first error component and a second error component;

compensate a receive clock of the access terminal based on a combination of the first error component and the second error component; and compensate a transmit clock of the access terminal based on a difference between the first error component and the second error component.

32. The non-transitory machine-readable medium of claim 31, wherein the processors are further configured to:

estimate the first error component and the second error component based on the obtained forward link error.

33. The non-transitory machine-readable medium of claim 32, wherein the first error component and the second component are estimated based on characteristics of a forward link signal and a baseband signal.

34. The non-transitory machine-readable medium of claim 31, wherein the forward link error includes a timing synchronization error between the access terminal and an access point with which it communicates.

35. The non-transitory machine-readable medium of claim 31, wherein the forward link error includes a frequency synchronization error between a forward link frequency and a baseband reference frequency.

36. The non-transitory machine-readable medium of claim 31, wherein the first error component is a clock drift error component for the access terminal and the second error component is a movement error component for the access terminal.

37. An access terminal comprising at least one processor, wherein the processor is configured to obtain a forward link error attributable to at least a first error component and a second error component;

compensate a receive clock of the access terminal based on a combination of the first error component and the second error component; and compensate a transmit clock of the access terminal based on a difference between the first error component and the second error component.

38. The access terminal of claim 37, wherein the processor is further configured to
estimate the first error component and the second error component based on the obtained forward link error.

39. The access terminal of claim 38, wherein the first error component and the second component are estimated based on characteristics of a forward link signal and a baseband signal.

40. The access terminal of claim 37, wherein the forward link error includes a timing synchronization error between the access terminal and an access point with which it communicates.

41. The access terminal of claim 37, wherein the forward link error includes a frequency synchronization error between a forward link frequency and a baseband reference frequency.

42. The access terminal of claim 37, wherein the first error component is a clock drift error component for the access terminal and the second error component is a movement error component for the access terminal.

* * * * *